(No Model.)

G. B. HART.
CULTIVATING PLOW.

No. 429,171. Patented June 3, 1890.

Attest:
J. M. St. John
S. H. Brainerd

Inventor:
George B. Hart

UNITED STATES PATENT OFFICE.

GEORGE B. HART, OF VIOLA, IOWA.

CULTIVATING-PLOW.

SPECIFICATION forming part of Letters Patent No. 429,171, dated June 3, 1890.

Application filed May 23, 1889. Serial No. 311,800. (No model.)

*To all whom it may concern:*

Be it known that I, GEORGE B. HART, a citizen of the United States, residing at Viola, in the county of Linn and State of Iowa, have invented certain new and useful Improvements in Cultivating-Plows; and I do hereby declare the following to be a full, clear, and exact description of the invention, such as will enable others skilled in the art to which it appertains to make and use the same.

This invention relates to plows used more especially in the weeding and cultivating of crops; and it consists in certain improvements in the cultivating-plow for which Letters Patent of the United States No. 398,393 were granted to me on the 26th day of February, 1889.

The object of this invention is to so improve the construction of the plow as to make its parts detachable, and also to provide the shovels with backwardly-extending prongs to break up and pulverize the soil, and lateral wings to prevent the soil from being thrown outwardly over the plants.

Figure 1:
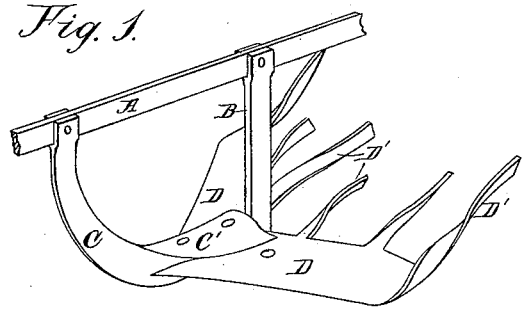
Figures 2, 3:
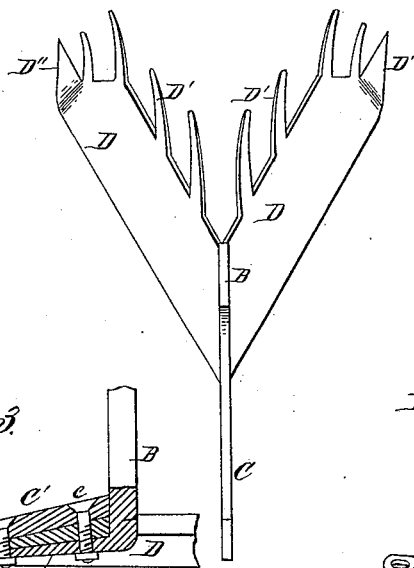
Figure 4:
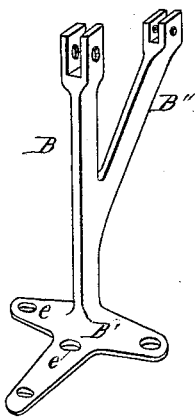

In the accompanying drawings, forming a part of this specification, Figure 1 is a view in perspective of a device embodying my invention, but without the lateral wings; Fig. 2, a plan view of a modified form of the same; Fig. 3, a fragmentary elevation, partly in central longitudinal section of the same, showing the manner of connecting the parts; Fig. 4, a view of the standard in perspective, and Fig. 5 a view in perspective of a modified form of shovel and standard.

Similar letters of reference indicate corresponding parts.

In its general characteristics the plow corresponds with that described in my Letters Patent above referred to.

In the drawings, A represents the beam; B, a standard connecting therewith; C, a forwardly-projecting blade, which may be connected with the standard at the top; and D, the shovel.

A part of my invention relates to improvements in the construction of the shovel D. This is composed of a single piece triangular in outline, and mounted to operate like an ordinary plowshare. The rear edge of this shovel is provided with a number of prongs or teeth D' D', over and among which the soil breaks as carried up by the shovel. These teeth may be of the simple form shown in Fig. 2, curved slightly and of practically uniform length, or in the preferred form shown in Fig. 1. In this case the teeth are twisted somewhat, so as to turn the soil, and are made of unequal length, so as the better to break up clods falling from the rear ends thereof.

A further improvement consists in providing the shovel with lateral upturned wings D'' D'', having forward cutting-edges and adapted to separate the upturned soil from the plants at each side, and so prevent the covering of the same. These may be used in connection with the teeth, as shown in Fig. 2, or independently of them, as in Fig. 5.

My invention also embodies certain improvements in the connecting of the parts of the plow. The lower end of the standard B is spread out into a suitable base B', with holes $e\ e$ therein. This base fits on the under side of the shovel D, and is secured thereto by bolts $c\ c$. The rear end of the blade C is flattened out and fitted to the upper side of the shovel, to which it is attached by bolts $c\ c$, passing through all the parts.

It is not absolutely necessary that the blade C should connect with the beam A, this construction being only necessary to secure the requisite strength in the standard. The standard may, however, be provided with a brace B'', and the connection of the blade with the beam then dispensed with, as indicated in Fig. 3. The blade may then be easily and quickly removed, and the remaining parts be used for potato-digging and the like.

Figure 5:
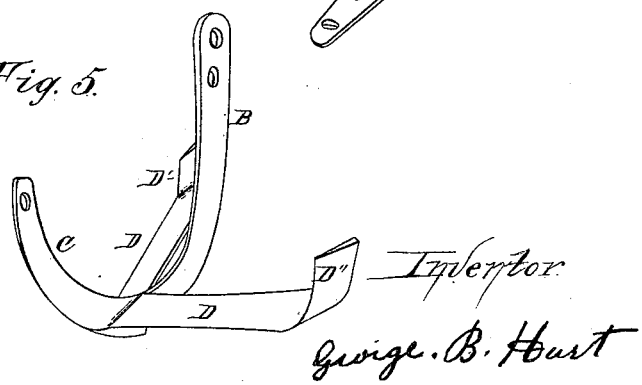

The construction shown in Fig. 5 is adapted to the connection of a handle or handles for hand use in gardening and the like.

Having thus described my invention, what I claim as new, and desire to secure by Letters Patent, is—

1. In a cultivating-plow, substantially as described, the combination of the standard B, cutter C, and shovel D, having backwardly-extending teeth D', substantially as and for the purpose set forth.

2. In a cultivating-plow, substantially as described, the combination of the shovel D, cutting-blade C, having rear extension C', the standard B, having base B', fitting the under side of the shovel, and connecting-bolts c c, substantially as described.

3. In a cultivating-plow, substantially as described, the combination of the standard B, cutter C, and shovel D, having backwardly-extending teeth D', and upturned cutter D" at the outer end, substantially as and for the purpose set forth.

In testimony whereof I affix my signature in presence of two witnesses.

GEORGE B. HART.

Witnesses:
J. M. St. John,
S. W. Brainerd.